July 3, 1956     W. C. SEIFERT     2,752,738
OVERLAY FOR AND METHOD OF GRINDING LENS BLANKS
Filed Sept. 4, 1953
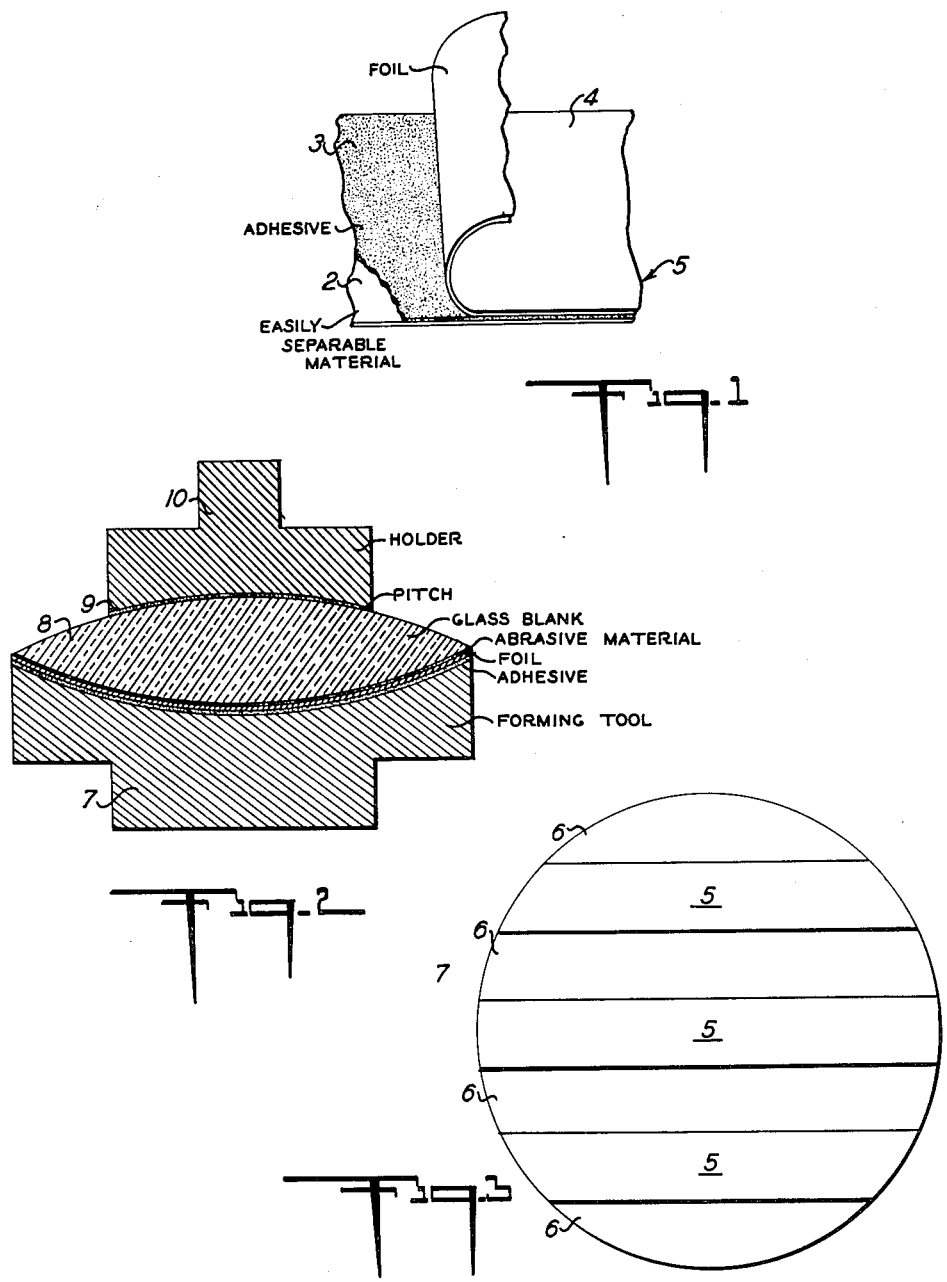
INVENTOR
WILLIAM C. SEIFERT
BY Louis Burgess
ATTORNEY

United States Patent Office 2,752,738
Patented July 3, 1956

2,752,738

OVERLAY FOR AND METHOD OF GRINDING LENS BLANKS

William C. Seifert, Narbeth, Pa., assignor to Donald W. Kent, Philadelphia, Pa.

Application September 4, 1953, Serial No. 378,526

2 Claims. (Cl. 51—195)

This invention is a new and useful overlay for and method of grinding glass blanks, as, for example, lens blanks for the manufacture of optical lenses. The invention will be fully understood from the following description read in conjunction with the drawing in which:

Fig. 1 is perspective view of the composite tape with the top layer partially turned back exposing the inside;

Fig. 2 is a vertical section through apparatus in which the grinding may be carried out; and Fig. 3 is a plan view of one element of the showing in Fig. 2.

Referring to Fig. 1, in composite tape 1, constituting the overlay, the elements are as follows:

Separating layer 2 is a ribbon of non-adhesive or only slightly adhesive material designed to permit the overlay to be wound upon itself but still be easily separable as parts are required for use. This may be paper impregnated with a high M. P. wax or thin sheet of poly-perfluor-ethylene or any other suitable material which is either non-adhesive or only slightly adhesive. Element 3 is a ribbon (for example, thin cloth) coated on both sides with a suitable adhesive material to enable it to adhere strongly to any surface against which it may be pressed. Such adhesives are known in the art and therefore need not be more full described. Element 4 is a layer of metal foil. This is pressed against and firmly adherent to the mating surface of layer 3. Layer 4 is formed of a ductile metal foil and is predominantly of nickel. Within the scope of this invention, I include nickel itself and the various high nickel alloys. The characteristics, for my purposes, appear to be determined by the nickel content and not by the alloying element or elements other than nickel since the behavior does not appear to be controlled by the presence of either copper, iron or chromium in lesser amounts. In general, the metal in addition to being principally of nickel, must have the physical properties which permit it to be worked into metal foil of the order of a few thousandths of an inch in thickness preferably between 5 and 10 thousandths of an inch.

In general, I have obtained excellent results with metal foil composed of nickel, of monel which is principally of nickel with a lesser amount of copper, as well as of ferro-nickel and inconel which are principally nickel with lesser amounts of chromium and/or iron.

The overlay may be wound in coils or strips for convenience of handling.

The method of use will be evident from the showing in Figs. 2 and 3. Referring to Fig. 3, the separating layer 2 is first removed and the remainder of the overlay is applied in the form of strips 5 to surface 6 of forming tool 7 which carries the master curve. The glass blank (for example a lens blank) 8 previously generated roughly into shape is secured by pitch 9 to holder 10. A slurry of abrasive material is fed continuously or intermitently to the grinding surface while working the blank against the grinding surface. The strips 5 will survive a large number of grindings and after they have become worn or are desired to be removed for any other reason, they are detached manually.

In my copending application, Serial No. 378,527 I have described an easily replaceable element for grinding or polishing in the form of a composite tape having a layer of adhesive material which may be secured in position by pressing it against the generating surface, a thermoplastic layer of optical pitch carried by the adhesive layer and an outer layer carried by the optical pitch adapted to hold grinding or polishing material, which outer layer may be a metal foil consisting predominantly of nickel.

I also find it desirable to form the forming tool of glass since the master surface is not abraded and the glass is resistant to corrosion by chemical action.

A large number of metal foils of the general composition hereinabove described, have been tested and these tests have shown that such foils in general have from 2 to 10 times the rate of removal of the material of the glass blanks as compared to all methods using solid grey iron working surfaces.

I claim:

1. An overlay for grinding glass blanks in the form of a composite tape, comprising a ribbon of thin, flexible material, a coating of adhesive on both sides of said ribbon and a ribbon of metal foil adhering to the adhesive on one side of said first mentioned ribbon, said metal foil consisting predominantly of nickel.

2. An overlay for grinding glass blanks in the form of a composite tape, consisting of a ribbon of thin, flexible material, a coating of adhesive on both sides of said ribbon, a ribbon of metal foil adhering to one side of said first mentioned ribbon, said metal foil consisting predominantly of nickel, and a ribbon of material that is not more than slightly adhesive, in contact with the other side of said ribbon of thin, flexible material.

References Cited in the file of this patent

UNITED STATES PATENTS

| | | |
|---|---|---|
| 369,431 | Brown | Sept. 6, 1887 |
| 1,560,033 | Bart | Nov. 3, 1925 |
| 2,024,303 | Obrig | Dec. 17, 1935 |
| 2,059,583 | Jackson et al. | Nov. 3, 1936 |
| 2,485,295 | Larson | Oct. 18, 1949 |
| 2,544,940 | Ritterbusch | Mar. 13, 1951 |